United States Patent [19]

Romberg

[11] Patent Number: 5,166,669
[45] Date of Patent: Nov. 24, 1992

[54] KEY ARRANGEMENTS AND METHODS OF USE

[76] Inventor: Harvey D. Romberg, 209 N. Locust St., Appleton, Wis. 54914

[21] Appl. No.: 674,672

[22] Filed: Mar. 25, 1991

Related U.S. Application Data

[63] Continuation of Ser. No. 210,238, Jun. 23, 1988, Pat. No. 5,003,301, which is a continuation of Ser. No. 861,879, May 12, 1986, abandoned.

[51] Int. Cl.$^5$ .............................................. G09G 3/02
[52] U.S. Cl. .................................. 340/711; 341/22; 400/489
[58] Field of Search ................ 400/486, 489; 340/711, 340/712; 341/23, 22, 29

[56] References Cited

U.S. PATENT DOCUMENTS

| 1,336,122 | 4/1920 | Banaji . |
| 1,342,244 | 6/1920 | Wolcott . |
| 2,040,248 | 5/1936 | Dvorak . |
| 2,080,457 | 5/1937 | Bower . |
| 3,698,532 | 10/1972 | Dodds . |
| 3,945,482 | 3/1976 | Einbinder . |
| 4,332,493 | 6/1982 | Einbinder ........................... 400/484 |

FOREIGN PATENT DOCUMENTS 2041295A 9/1980 United Kingdom .

*Primary Examiner*—Jeffery A. Brier
*Attorney, Agent, or Firm*—Thomas D. Wilhelm

[57] ABSTRACT

An improved key arrangement with the keys arranged to accommodate increased speed, and to facilitate learning by someone already familiar with the standard Qwerty key arrangement. The invention also includes a method of converting a conventional keyboard, used with a computer, to the keyboard of the instant invention, by converting codes emanating from the keyboard into codes representing those of the keyboard of the invention. Likewise typewriters may be converted by use of printing elements compatible with the new key arrangements.

14 Claims, 3 Drawing Sheets

ASER

MODIFIED DVORAK

QWERTY

① ② ③ ④ ⑤ ⑥ ⑦ ⑧ ⑨ ⓪

317 (Q) (W) (E) (R) (T) (Y) (U) (I) (O) (P) (½) 221
    3   16   130   76   92   19   26   74   75   27

221 (A) (S) (D) (F) (G) (H) (J) (K) (L) (;) (") 75
    74   61   42   28   16   34   2   3   36

62   (Z) (X) (C) (V) (B) (N) (M) (,) (:) (?) 104
       1   5   31   15   10   79   25

<u>600</u>   78   82   203   237      185   77   111   27   <u>400</u>

KEY ARRANGEMENTS AND METHODS OF USE

CROSS REFERENCE TO RELATED APPLICATIONS

This application is a continuation of prior application Ser. No. 07/210,238 filed Jun. 23, 1988, now U.S. Pat. No. 5,003,301 granted Mar. 26, 1991, which is a continuation of Ser. No. 861,879 filed May 12, 1986, now abandoned.

BACKGROUND OF THE INVENTION

This invention relates to keyboards, and particularly keyboards which are used to input information into a typewriter, a word processor, or a computer.

History records that, at the time the standard Qwerty keyboard was developed in the late 1800's it way purposely designed to limit the speed with which a user could strike the keys. Because of the mechanical limitations in typewriter development, it was necessary at that time to limit the speed at which a typist could type, so that internal parts, in the typewriter, and particularly key levers, did not become jammed. The keyboard was therefore designed in such a way that high speed typing was awkward, and the keyboard arrangement automatically disabled the highest typing speeds theoretically obtainable by a skilled user.

Particularly in the typewriters available at that time, the type striking mechanism depended on gravity to return the type key lever after it had struck the paper. Thus the typing speed had to be slow, or the striking type levers would pile up on the returning type levers and jam the machine.

Many improvements have since been made in operating mechanisms of the typewriter, and now word processors and computers, so that the operating mechanisms no longer require a key arrangement that is disabling and awkward to the typist. Thus the disabling key arrangement, which had once been an asset to the typist, and was rather effective in limiting jamming from excessive typing speed, has become a costly and unnecessary problem. The standard Qwerty keyboard slows the speed of typing, increases the frequency of errors, loads the hands and fingers with disproportionate amounts of work, and produces fatigue in the hands and fingers of the typist.

Attempts have been made to remedy the faults of the Qwerty key arrangement but none has yet replaced that standard keyboard in regular use. Some of the key arrangements designed as improvements are those by F. M. M. Banaji, U.S. Pat. No. 1,336,122; C. Wolcott, U.S. Pat. No. 1,342,244; A. Dvorak et al, U.S. Pat. No. 2,040,248; R. G. Bower, U.S. Pat. No. 2,080,457; and X, U.S. Pat. No. 3,847,263.

Among these key arrangements, the only one known to have any degree of success at all is the Dvorak key arrangement, which is believed to be commercially available, although little known and little used, even though it has been in existence for approximately 50 years.

While a number of attempts have been made to solve the problem of inefficient key arrangements, the commercial market place is still committed to the use of the standard Qwerty keyboard in the absence of an alternative key arrangement which promises increased productivity once the new arrangement is learned, in combination with ease of learning the new arrangement.

In reviewing the attempts at improving the key arrangement, two major issues should be addressed. First, the improved key arrangement should offer significantly improved productivity, of keyboard output, for a skilled operator who has learned the improved key arrangement. Second, the training time for learning the improved key arrangement should be minimized. The first issue of improved keyboard output appears to have been more-or-less resolved by X, Dvorak, Dodds, and Bower, by putting the most-used keys on the home row. But a major problem in adopting those keyboards is that they make dramatic changes in the key locations, as compared to the standard Qwerty key arrangement. Dvorak relocates all but three of the keys in the three lower row. X, Dodds and Bower relocate all except two of the keys in the three lower rows. So it is clearly evident that very little of the knowledge about key location on the Qwerty key arrangement can be transferred to the other key arrangements of the prior art. Thus those prior art key arrangements which theoretically succeed at solving the productivity issue have little in common with the locations of the keys on the Qwerty keyboard; and the training amounts to a complete retraining of the user. And while Banaji has more keys in common with the Qwerty key arrangement, which facilitates the conversion training, Banaji does not indicate the desired productivity increase, using the same home row use criteria for determining productivity.

Thus, it is clear that there is a need for an improved key arrangement for keyboard operators. The key arrangements proposed in the past have not been widely accepted in the commerical market place; and it appears that this lack of acceptance is because they all fail to address at least one of the two major criteria of (i) potential productivity increase and (ii) acceptable training time. For those key arrangements which do indicate increased productivity, apparently no large user has been willing to pay the cost of the training, and no manufacturer has been willing to risk investing in the necessary tooling to make wholesale changes in this market, without the support of large users.

With the introduction of word processors and personal computers, any changes in key arrangements should be considered for adaptation to the computer and word processor market, as this represents an important segment of the commercial use of keyboards.

It is an object of this invention to provide an improved key arrangement which facilitates increases in typing speed while maintaining many of the keys in the same position as the Qwerty key arrangement, or a position close to that in the Qwerty key arrangement. By so maintaining many of the keys in the same position, the amount of training required to learn to use the new key arrangement is minimized.

The prior art has addressed the issue of balancing the work load between the left hand and the right hand, such that the work load is more balanced between the two hands. It has also addressed the issue of placing keys which have the most use on the home row, and of placing the most heavily used keys in position where they will be used by the strongest fingers.

While these attempts at improving the key arrangement have theoretical basis for improvements in the speed and efficiency of the sue of the keyboards, they fail to address the human factor of previous knowledge of the Qwerty key arrangement and how that affects learning the new key arrangement. And indeed, if typists were first trained on them, the new key arrangements proposed in the prior art might possibly be accepted. However, most people having potential for immediate use of the new key arrangement are those who have already been trained on the Qwerty key arrangement. By ignoring the users' existing knowledge, previous key arrangements have required that the user learn a new key arrangement where the locations of virtually all the keys have been changed from their locations in the Qwerty key arrangement, which the users are used to. Such a drastic change in the key arrangement has been difficult for the user to learn. History shows that few people are using previously proposed new key arrangements. It is clear that a new key arrangement is desirable, and that great benefit could be obtained from it.

In the instant invention, the advantages of having the most commonly used letters on the home row of the keyboard are retained. The key arrangement in the home row is further improved, in that, compared with key arrangements previously proposed for replacing QWERTY, more of the keys in the home row are left in the positions they occupy in the QWERTY key arrangement. Overall, half of the letter keys in the instant keyboard remain in the same positions they were in in the Qwerty keyboard, while more commonly used keys have been moved to the home row. In large part, the distance of movement of each key has been minimized.

For the fourteen keys in the three letter rows which have been moved, only two keys, K and T, have been moved any substantial distance. Thus significantly different locations need be learned for only these two keys. The other keys are either the same as in Qwerty, or are close by and easily found by remembering the Qwerty key arrangement. This close relationship to the location in the Qwerty arrangement makes the adaptation to the new key arrangement all the easier.

Improvement in typing speed and ease of recognition and learning of the new system are important on any new key arrangement.

These two criteria are fulfilled in the instant new and improved key arrangement. Ease of association is a strength of this key arrangement. The new letter layout puts the following letters on the "home row", which is the center row of the three rows in the letter portion of the key arrangement. The home row letters

ASER D HN TIO also contain the name of the new system. For easy identification and referral to this new letter arrangement, it is referred to as the ASER key arrangement, which is the letter pattern of the home keys for the left hand on the center row of letters. The balance of the letters can easily be remembered when they are incorporated into the name of the keyboard. Therefore the new system, for memory purposes, can be called ASER D HN TIO. This enables a person to immediately memorize the home row of the keyboard. The pronunciation of the name rhymes with the following words (Laser-Dee-Hen-Tie-Oh). Thus by having an assist in the pronunciation of the name, which represents the home row, the new user readily identifies and remembers all of the keys on that home row after a short time. The home row typically represents about 70% of the letter key use of the three rows of letter keys on an ASER keyboard.

Another aspect of the invention resides in use of the invention to convert standard Qwerty keyboards, or the like, on electronic word processors and computers into the new and improved instant key arrangement. This is done by supplying software which converts, as necessary, codes emanating from the keyboard, into corresponding codes for the characters in the key arrangement of the instant invention. Existing keyboards can continue to be used while the codes are converted by the software. The codes are, of course, converted such that the computer or word processor sees the keyboard as though it were a keyboard of the instant invention. Typewriters and some printers having printing elements such as ball elements or printwheels, are converted by replacing the ball or printwheel, or other printing element, with appropriate printing elements adapted for the ASER system. A keyboard may likewise be converted by moving key caps if desired.

BRIEF DESCRIPTION OF THE DRAWINGS

FIG. 4A is a key arrangement of the invention showing the relative amount of use of each key.

FIG. 4B is a modified DVORAK key arrangement believed to be currently commercially available, and showing the relative amounts of use of each of the keys.

DETAILED DESCRIPTION OF THE ILLUSTRATED EMBODIMENT

Figure 1:
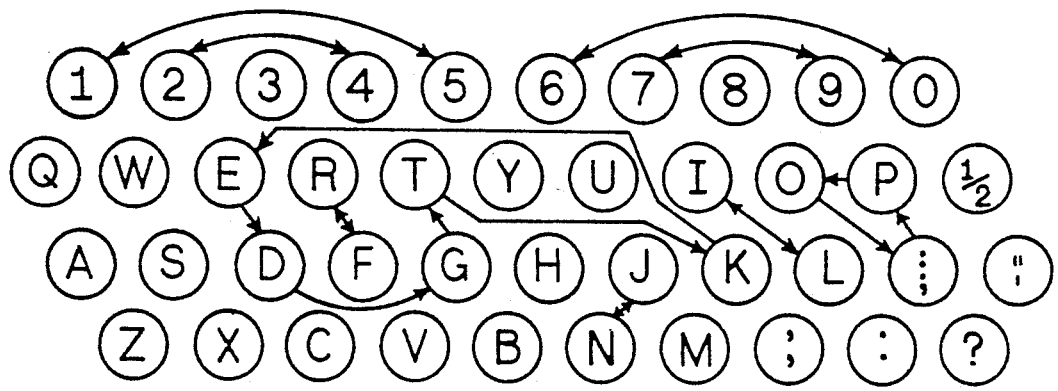
FIG. 1 is a top view of a Qwerty key arrangement and showing, by means of arrows, the relocations of the various keys in this invention.
Figure 2:
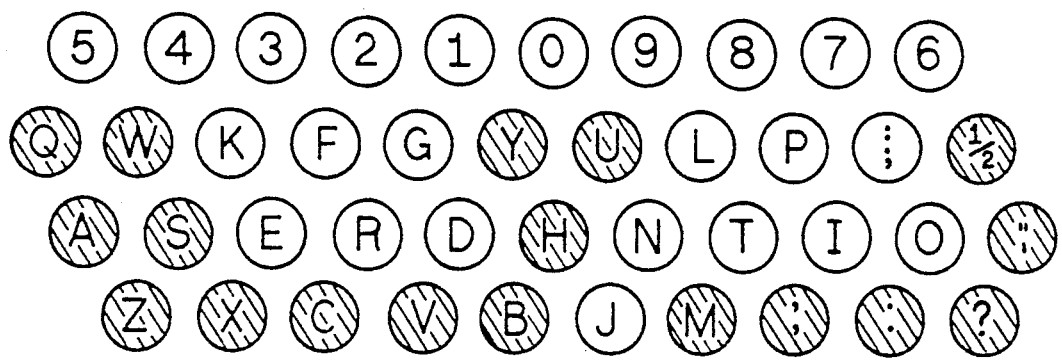
FIG. 2 is a top view of a key arrangement of this invention wherein all the keys have been relocated according to the movements indicated by the arrows in FIG. 1.

The key arrangements illustrated in FIGS. 1 and 2 have four rows of keys. Three rows of keys represent the letters and punctuation marks, primarily, and, in most writing, carry the bulk of use. The fourth row represents numbers. The middle row of letter keys is known as the home row. The row above it is known as the upper row. The row below it is known as the lower row. The number row is the row above the upper row.

FIG. 1 shows the standard Qwerty key arrangement, with arrows indicating movement of keys to arrive at the key arrangement illustrated for this invention. It is seen that most of the movements of letter keys are of minimal distance. Thus the E moves to the D position. R and F trade places with each other. G moves to the T position. D is moved to the G position. T moves a substantial distance to the K position and K moves a substantial distance to the E position. J and N trade places. I and L trade places. O moves into the semicolon position of the home row. P moves to the O position, and semicolon moves to the P position.

Thus the only keys that move a substantial distance are the T and the K, with the D moving an intermediate distance. It is significant to notice the number of keys which are not moved. Particularly the lower row remains intact with the change of only the N key. Similarly A, S, H and apostrophe are not moved in the home row, and Q, W, Y, U and ½ are not moved in the upper row. Most of the characters which are moved are moved only a short distance, so the mental identity of the character with the general location on the key arrangement is not affected for the majority of the letter keys.

The keys in the number row are moved to positions for more effective use. And while the number and distance of moves of the number keys is significant, this is accepted in that the numbers are often used less frequently, and thus the learning time is less critical. The numbers have been rearranged to take advantage of the stronger fingers using the number keys which find the most use, namely 2, 1, 0, and 9. In order to rearrange the keys in such a way that it would be easy to remember their locations, it was important to identify an easily remembered number pattern that retains the 2, 1, 0 and 9 near the center of the row. The final layout of the number row is that of decreasing numbers from left to right starting with 5, then 4, 3, 2, 1, 0, 9, 8, 7, and 6; the step between 0 and 9 being a discontinuity in the general decrease. By following an easily recognized pattern, the location of the numbered keys is quickly learned and remembered, while the positioning of the most used keys in the center of the row is accomplished. Also, the fact that 3 and 8 have not moved aids in learning the new arrangement.

Thus in the illustrated improved key arrangement, the letters on the home row are, from left to right A, S, E, R, D, H, N, T, I, O, and apostrophe. The characters on the upper row are, from left to right, Q, W, K, F, G, Y, U, L, P, semicolon, and ½. The character arrangement on the lower row is Z, X, C, V, B, J, M, comma, period, and question mark.

The key arrangements of the invention not only offer high use of the home row for increased productivity, they also offer ease of learning. The ease of learning has plural elements. First, many of the letter keys are commonly located as in the Qwerty key arrangement. Second, the ASER D HN TIO acronym of the illustrated embodiment is easily remembered and aids in quick recognition of letters on the home row. Third, only two letters of the illustrated embodiment have been moved a substantial distance. The others are in the same general area they were in on the Qwerty key arrangement; so the knowledge of the Qwerty key arrangement helps in quickly and efficiently locating them on the ASER key arrangement.

The frequency of use of letters in the English language was studied by tabulating the letter use in government plain text telegrams. The following Table 1 shows the number of times that a letter appears for each 1000 letters of text.

TABLE 1

| E 130 | L 36 | W 16 |
|---|---|---|
| T 92 | H 34 | V 15 |
| N 79 | C 31 | B 10 |
| R 76 | F 28 | X 5 |
| O 75 | P 27 | Q 3 |
| A 74 | U 26 | K 3 |
| I 74 | M 25 | J 2 |
| S 61 | Y 19 | Z 1 |
| D 42 | G 16 | |

While specific studies of letter usage may find minor deviations from Table 1, the relative usage of the letters is somewhat established and some minor deviations in other studies are not of concern, as they point in the same general direction. When I say herein "normal letter usage", I mean with regard to the usage frequencies as defined in Table 1, or similar frequencies, for the English language. Observing the U.S. Pat. No. 3,847,263 to X, it is seen that essentially all the letters in the home row in the instant invention appear in the home row in the X patent. The difference, and significance, of the home row in the instant invention, as compared to X, is that the applicant herein has preserved the location of four of the keys from the original Qwerty key arrangement in the home row, whereas X has preserved only the H key in the same position as in the Qwerty key arrangement. The increased retention of keys in the same position, of course, facilities learning the modified key arrangement.

For a person who already knows the Qwerty key arrangement, any key on a new key arrangement which is in the same position as on the Qwerty key arrangement need not be relearned. Its location is already known. Also, for those keys which are moved, moves of short distance are preferable to longer distance. Usually, this aids in learning the new location, as it can be mentally associated with the known location on the known Qwerty key arrangement. It is seen previously that certain prior art key arrangements leave few keys in the same location as they are in in the Qwerty key arrangement. Another method of measuring difficulty in learning a new key arrangement is to quantify, not only how many keys are moved, but also how far the keys are moved. The locations of keys which are moved farther are harder to remember than keys which are moved only a short distance; as the location association can generally be retained for a short distance move, but is of less value for a longer distance move.

One method of quantifying movement of key location is to determine the number of spaces to the left or right, up a row or down a row, that a key has been moved from its location in the Qwerty key arrangement to its location in the new key arrangement. For example, referring to FIG. 1, "R" and "F" are each seen to move one space. "D" moves two spaces. "T" moves down one space and right three spaces, for a total movement of four spaces. Using this measure, each and any key arrangement can be measured for its amount of key movement relative to any other key arrangement. Since the Qwerty key arrangement is the standard which most people are used to, and would transfer from, measurement of key location relative to the Qwerty key arrangement represents one meaningful means of estimating the ease or difficulty of learning the new key arrangement. Whenever herein I talk about key movement, or movement of key location, each unit of movement represents one key moved to an adjacent location, either right or left, up, or down, and relative to the Qwerty key arrangement unless otherwise indicated. Up and down movements include an appropriate right or left angling to the adjacent key. Total key movement or total movement of key locations is the sum of all the key movements in a particular key arrangement.

Another concern with any key arrangement is the amount of hand movement required, which may be expressed, for example, as the percentage of keystrokes on the home row, or the number of times the fingers must leave the home row.

Table 2 compares the illustrated key arrangements of the invention against the key arrangements of the known prior art, as measured by (i) percent use of home row based on Table 1, and (ii) total movement of key locations for the three rows of keys containing letters.

TABLE 2

|                 | Total movement of key locations | Percent use of home row keys |
|-----------------|---------------------------------|------------------------------|
| ASER            | 26                              | 73.7%                        |
| X               | 134                             | 72.1%                        |
| DVORAK          | 118                             | 68.7%                        |
| DVORAK, Modified| 127                             | 68.7%                        |
| DODDS           | 118                             | 68.7%                        |
| WOLCOTT         | 107–108                         | 47.0%                        |
| BOWER           | 81                              | 73.7%                        |
| BANAJI          | 53                              | 32.6%                        |
| QWERTY (control)| 0                               | 29.6%                        |

Acceptance of a particular key arrangement appears to be sensitive to both the difficulty of learning it, as, for example, measured as total key movements, and the potential for greater efficiency once the new key arrangement is learned, as measured by the percentage of the keystrokes which use the home row keys. The preferred key arrangement will have high use of home row keys with acceptable learning effort.

As seen in Table 2, the Qwerty key arrangement, as the control, has —0— key movement and the lowest use of home row keys. Of the prior art, after Qwerty, Banaji has lowest total key movement, but home row use is still low. Bower, Dvorak and X all have high home row use, but also have high total key movement. Only in the instant invention as in the illustrated ASER key arrangement is there seen high use of the home row in combination with reduced total key movement relative to the Qwerty key arrangement. Of the key arrangements known to the applicant, only ASER offers substantial increase in home row use, over Qwerty, with less than a total of 53 key movements. Indeed ASER is far superior, in that it has less than half the total key movements of Banaji, which is second best in key movement. But Banaji is inferior regarding home row use. At the same time, ASER's home row use is at least equivalent to those prior art keyboards that do substantially improve home row use. Indeed, the invention resides in a key arrangement where at least 40%, preferably greater than 60% of the keystrokes in normal letter usage in the English language are on the home row, in combination with less than 81, preferably less than 53, highly preferably less than 40, and most preferably less than 30 total key movements, as compared to a Qwerty key arrangement.

Figures 4A, 4B:
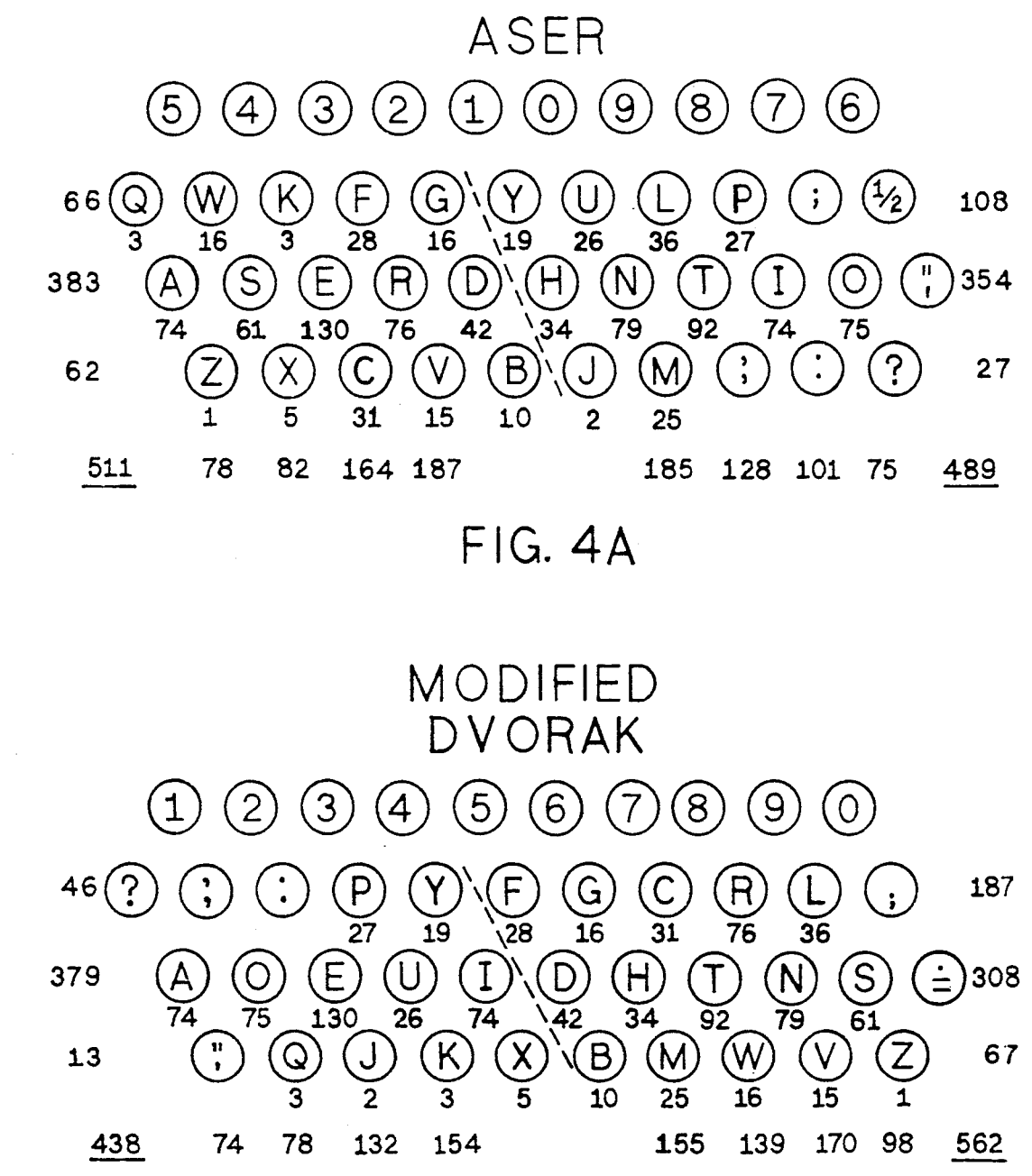
Figures 4C, 5:
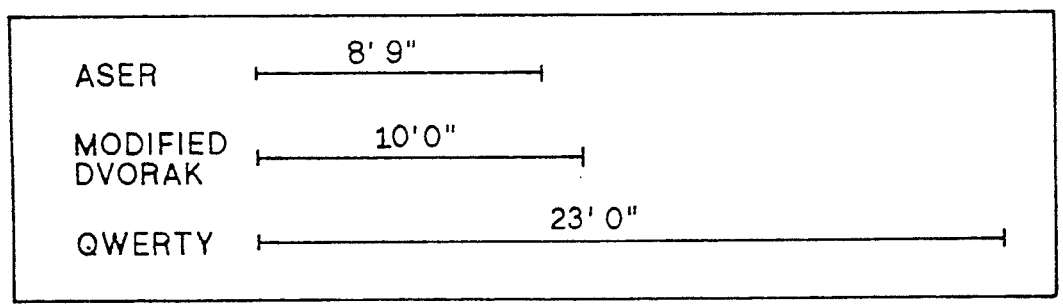
FIG. 4C is a Qwerty key arrangement showing the relative amount of use of each of the keys.
FIG. 5 shows a bar graph illustration representing typical relative amount of finger travel between rows of keys using the standard Qwerty key arrangement, the modified Dvorak key arrangement and the ASER key arrangement of the instant invention.

FIG. 4A shows a key arrangement of the invention with the relative amount of use of each key, according to Table 1, being shown, and with the total keystrokes for each finger being shown as the bottom row of the figure. It is seen in FIG. 4A that the strongest, inner, fingers are worked hardest, and the weaker outer fingers are used progressively less. Likewise, use of left and right hands is essentially balanced. Similar comparison with the modified Dvorak key arrangement in FIG. 4B shows less balance between hands. Comparison with the QWERTY key arrangement shows, in FIG. 4C, less balance of total keystrokes between hands, and interrupted finger use progression on the right hand.

The applicant herein has made a study of the relative use of the home row letter keys as compared to the use of keys off the home row in typing a particular piece of classical literature. The literature chosen was "The Lords Prayer". In typing that prayer with the ASER key arrangement, the modified Dvorak key arrangement and the Qwerty key arrangement, it is seen, according to following Table 3, that the ASER key arrangement is a little better than the modified Dvorak key arrangement regarding home row usage, namely 75% and 72% respectively, while the Qwerty key arrangement has substantially less use of the home row at about 35%. While these statistics deviate slightly from the numbers in Table 2, the deviations are small, and the number relationships are similar—namely ASER is best when compared to the known art.

TABLE 3

|                              | QWERTY    | Modified DVORAK | ASER      |
|------------------------------|-----------|-----------------|-----------|
| Character use on home row    | 98 (35%)  | 202 (72%)       | 212 (75%) |
| Character use off the home row | 184 (65%) | 80 (28%)       | 70 (25%)  |

Thus it is seen in this practical comparison, and from Tables 1 and 2, that the ASER keyboard layout is better than modified Dvorak in terms of the usage of the home row.

Combined distance of finger travel is somewhat of a measure of theoretical possible speed and of a theoretical fatigue factor. The combined distances of finger travel for the above practical use study are graphically portrayed in FIG. 5. In the assemblage of data for FIG. 5 the distance between the home row keys and the upper or lower row is assumed to be $\frac{3}{4}$ of an inch for demonstration purposes; thus the total distance traveled from the home row to the upper or lower row and back to the home row to strike one key is 1½inches–$\frac{3}{4}$ inch off the home row and $\frac{3}{4}$ inch back. It is seen graphically, then, in FIG. 5 that both the Dvorak key arrangement and the ASER key arrangement provide significant reduction in finger travel over the standard Qwerty key arrangement.

With the ASER key arrangement maintaining substantial identity similarities with the Qwerty key arrangement, and with its theoretical efficiency as measured by finger travel and home row use being similar to Dvorak, the ASER system is clearly superior to Dvorak; by providing a use efficiency similar to Dvorak, once learned, in combination with fewer new keys locations to be learned, and thus less training time.

Figure 3:
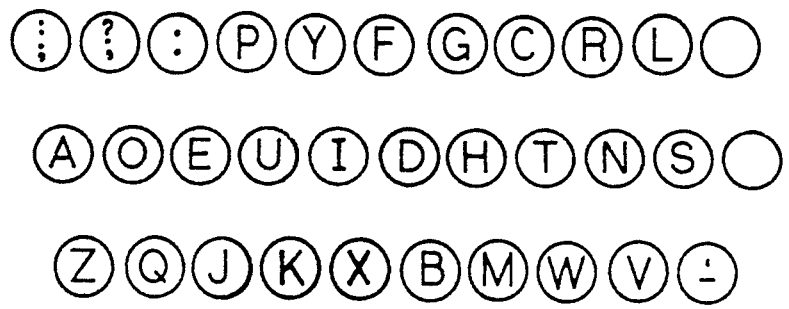
FIG. 3 represents the Dvorak key arrangement.

In FIGS. 2 and 3, the letter and punctuation keys which are commonly located according to the Qwerty key arrangement are cross hatched in order to highlight the dramatic change in converting from the Qwerty key arrangement to the Dvorak key arrangement as compared to converting from the Qwerty key arrangement to an ASER key arrangement.

A significant problem in obtaining adoption of the use of new keyboard arrangements is that the new keyboard arrangements and associated printing accessories, are not generally physically available from equipment suppliers. The one exception is that the Dvorak keyboard, or perhaps the modified version, and equipment is believed to be available as a special order option in some products, such as typewriters and computers. Thus, on the whole, it is difficult for people to obtain practice and training on a new key arrangement because they are not able to obtain the equipment. And while a typewriter may be converted by obtaining a new type ball or a new printwheel, designed according to the new key arrangement, the new balls and printwheels are not generally available either. The basic problem is how one gains access to use of the new key arrangement when hardware/equipment is not generally available. Another problem is how to make the conversion at reasonable cost.

One solution to this problem is found in the use of a computer, such as a personal computer, as supplied with a standard Qwerty keyboard. The basic concept is that electrical signals, hereinafter called codes, emanating from the standard keyboard are converted, as necessary, by software to represent codes which would emanate from a new (i.e. ASER) keyboard. For example, a "D" on the standard keyboard is in the same location as the E in the ASER keyboard. Using a standard keyboard, and software to make the code conversions, a "D" code emanating from a standard keyboard is converted to an "E" code. Codes from the other characters are converted similarly, as necessary, to represent the new keyboard. Thus with only a software input, the standard keyboard can be converted to appear to function like as ASER keyboard. If desired, the keyboard keys can also be marked with the new ASER character arrangement, or the key caps moved according to the new arrangement. This is not always desirable, since it is possible to temporarily convert the computer keyboard to the new system, and later have it revert to its original system.

The capability of converting a computer keyboard to the ASER arrangement temporarily and then converting back to a standard keyboard enables people to learn the system at their own pace, without having to simultaneously commit commercial operations to the use of the new key arrangement, since the software permits conversion back and forth at will. Indeed it is possible to learn the new ASER System on existing equipment using only a software change, while continuing to use that same conventional equipment with a conventional keyboard.

In typical introductory use of the ASER System in a computer, the code converting software is first inputted into the computer itself. "Inputting" may comprise putting the code converting software into the computer memory, or the computer may interact with inputted software on an external source, such as a floppy disk in a personal computer. After the software is inputted, any key which is depressed is seen by the computer, after software processing, in its ASER format. If a key in the ASER arrangement is in an identical location to that in the keyboard as originally manufactured, the code emanating from the keyboard is the same as that eventually received by the computer. For those keys which are different between ASER and the original system, the software intercepts the character codes emanating from the keyboard and changes them to the codes which would emanate from an ASER keyboard when these same keys are depressed. Thus functionally the keyboard has been temporarily converted to an ASER key arrangement. The conversion is effective so long as the software remains in the computer. Once the software is removed, the intercept and conversion ceases, and the keyboard reverts to its original arrangement.

Code conversions may also be made by making changes in the computer hardware, such as modifying the effective matrix arrangements, changing or adding chips, and the like. In general, hardware changse are more-or-less permanent, and are desirable where the reversion between the old and new key arrangements is not anticipated.

In typical training for the use of the illustrated ASER keyboard or ASER Typing System, the software is inputted into the computer to convert it to the ASER System. The keyboard may then be used as an ASER key arrangement for the period of training desired. When the period of training has been completed for a given time, the software may be removed from the computer, reverting the keyboard back to its base configuration, for example, the Qwerty configuration. Thus it is entirely possible to train on the ASER System while using the conventional keyboard hardware. After the training period is finished, the keyboard may revert to its original layout, and be used for production purposes. As familiarity with the ASER keyboard is gained, the users may choose to convert productive work to the ASER System at their own pace and on their own timing. Where a plurality of users are training at any given time, each user has the choice of configuring the keyboard in either the conventional mode or the ASER mode for any particular time period.

Training for a new key arrangement having a substantial number of keys in common with the Qwerty key arrangement facilitates training, in that words and sentences can be constructed from the common keys, so that the user immediately has the capability to use a limited vocabulary. The moved keys may then be introduced as desired. For example, a new user of the illustrated ASER key arrangement who knows Qwerty, can type the following sentence without further training, because all the keys are in the same location on both key arrangements.

Sam may amass as much cash as 38 bums awash by a quay.

in terms of converting the codes emanated from a non-ASER keyboard to ASER code, it is preferred that the codes emanating from the keyboard be intercepted by the software and compared to the desired ASER code. If the desired ASER code is already present as emanating from the keyboard it is forwarded without change. If the code emanating from the keyboard is different from the ASER code, then as ASER code is generated either separately, or through conversion of the code emanating from the keyboard, and forwarded.

Thus the invention may take on the character of being a method of inputting information into a computer through a keyboard, and particularly a conventional keyboard, through the conversion processes of the invention. For using a conventional keyboard, the converting software is, of course, first installed in the computer. The keys on the keyboard are then depressed as desired, thereby generating coded impulses for the various keyboard characters. The software converts the coded impulses such that coded impulses received by the computer from depressing of the keys on the standard keyboard are the impulses that would be received from a keyboard wired to use the ASER arrangement.

The invention can also be considered as hardware, namely a keyboard with a particular arrangement, or family of arrangements, of keys. Other hardware of the invention is in the printing elements, exemplary of which are printwheels and ball elements, particularly for use with converted Qwerty typewriters. On printing elements, where one ASER character replaces another on the Qwerty keyboard, the same replacement is made on the printing element.

In another sense the invention is a method of converting an electronic keyboard to a second key arrangement, where the method is that of converting the codes emanating from the keyboard into the corresponding codes for the characters in the second key arrangement.

FIG. 5 indicates that the ASER key arrangement is functionally somewhat more efficient than the Dvorak key arrangement. As seen in a comparison of FIGS. 1, 2 and 3 for the commonality in key locations between the Qwerty key arrangement, the Dvorak key arrangement and the ASER key arrangement, it is seen that it is easier for a person who knows the Qwerty key arrangement to learn the ASER key arrangement because of the greater similarity between the ASER and Qwerty key arrangements.

Yet another way of considering the invention is that it resides in a key arrangement, or in a typewriter or a computer having a key arrangement, which has increased use of the home row, in combination with less than 81 total key movements.

The invention herein has been described in terms of a specific key arrangement, namely that of FIG. 2, referred to as the ASER key arrangement. It is seen, though, that the ASER key arrangement, shows for the first time, the desirability, and ability, to combine high percentage home row use with a low number of total key movements; and where many of the moved keys move only a short distance. Now that the ASER key arrangement of FIG. 2 has been disclosed, it is entirely possible to make minor modifications to it while maintaining the spirit of the invention. Indeed, any key changes can now be easily measured for their effect on the keyboard use against the ASER arrangement, according to the criteria taught. It is anticipated that several modifications of ASER are possible which fulfill the criteria of high home row use in combination with low total key movement of less than 53, preferably less than 40, and most preferably less than 30. While lower numbers may be even more preferred, a certain amount of key movement is necessary to create the high home row use, and so key movements of much less than 30 are not likely to be associated with highest home row use. It is preferred that home row use be at least 50%, preferably at least 60%, most preferably at least 70%, recognizing that the theoretical upper limit for 10 letter keys is about 74%, based on the 10 most used letter keys as illustrated in Table 1. So long as these two criteria are met, any key arrangement falls within the scope of the invention.

Having thus described the invention, what is claimed is:

1. In a keyboard for typewriters, word processors, computer terminals and the like having a plurality of manually actuated keys including keys for each letter of the alphabet and a plurality of character keys wherein the keys are arranged in rows including a central home row, an upper row thereabove, and a lower row therebelow, and wherein the key alphabet letter and character arrangement in the several rows varies from the standard three-row QWERTY arrangement with a plurality of keys relocated to different positions from the QWERTY positions, the improvement comprising:
said home row having alphabet letter keys
(1) representing at least 40% of normal keystrokes in English-language writing, and
(2) wherein at least three keys have the same positions as in the QWERTY home row key arrangement;
said relocated keys in all said rows having a minimum key position spatial relocation of fewer than eighty-one (81) total key position movements from the said QWERTY arrangement,
whereby speed of keyboard use is maximized and retraining time for QWERTY keyboard users is minimized.

2. The keyboard of claim 1 wherein a minimum number of alphabet keys fewer than fifteen in all three said rows are relocated from the QWERTY arrangement.

3. The keyboard of claim 1 wherein said home row keys represent at least 50% of said normal keystrokes.

4. The keyboard of claim 1 wherein said home row keys represent at least 60% of said normal keystrokes.

5. The keyboard of claim 1 wherein said home row keys represent at least 70% of said normal keystrokes.

6. The keyboard of claim 1 wherein said minimum key position relocation represents fewer than 53 total key movements.

7. The keyboard of claim 1 wherein said minimum key position relocation represents fewer than 40 total key movements.

8. The keyboard of claim 4 wherein said minimum key position relocation represents fewer than 30 total key movements.

9. The keyboard of any of claim 1 wherein at least four keys in said home row have the same positions as in the QWERTY home row key arrangement.

10. The keyboard of claim 1 wherein the key location corresponds to that of QWERTY arrangement for the keys Q, W, A, and S.

11. In a keyboard for typewriters, word processors, computer terminals and the like having a plurality of manually actuated keys including keys for each letter of the alphabet and a plurality of character keys, the keys being arranged in rows including a central home row, an upper row thereabove, and a lower row therebelow, and wherein the key alphabet letter and character arrangement in the three rows varies from the standard three-row QWERTY arrangement with a plurality of keys relocated to different positions from the QWERTY positions, the improvement comprising:
said home row having alphabet letter keys representing at least 40% of normal keystrokes in English-language writing, and
wherein in said rows at least nine keys have the same positions as in the corresponding three rows on the QWERTY key arrangement,
whereby speed of keyboard use is maximized and retraining time for QWERTY keyboard users is minimized.

12. The keyboard of claim 11 wherein a minimum number of alphabet keys fewer than fifteen (15) in all three said rows are relocated from the QWERTY key arrangement.

13. The keyboard of claim 11 wherein in said three rows at least eleven (11) keys have the same positions as in the corresponding three rows on the QWERTY key arrangement.

14. The keyboard of claim 11 wherein said minimum key position relocation represents fewer than 53 total key movements.

* * * * *